April 7, 1964   G. P. PATRIQUIN ETAL   3,128,116
RETAINER MEANS FOR CYLINDRICAL LOCKS
Filed Nov. 15, 1961                                    2 Sheets-Sheet 1
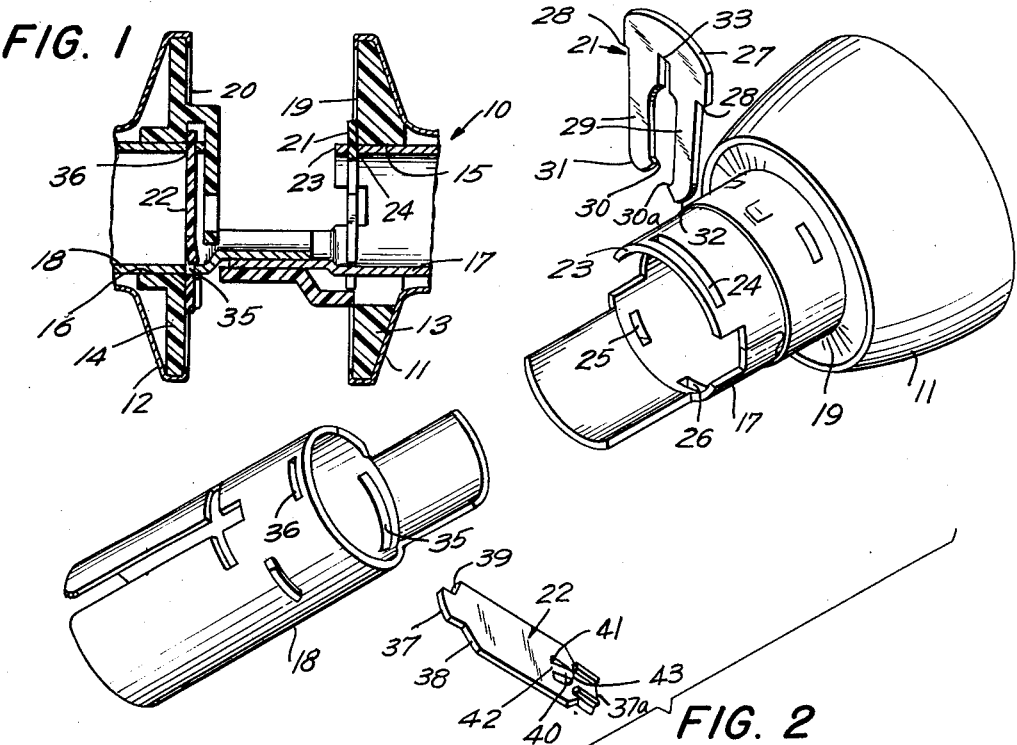
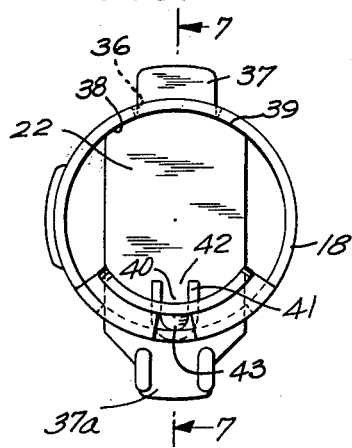
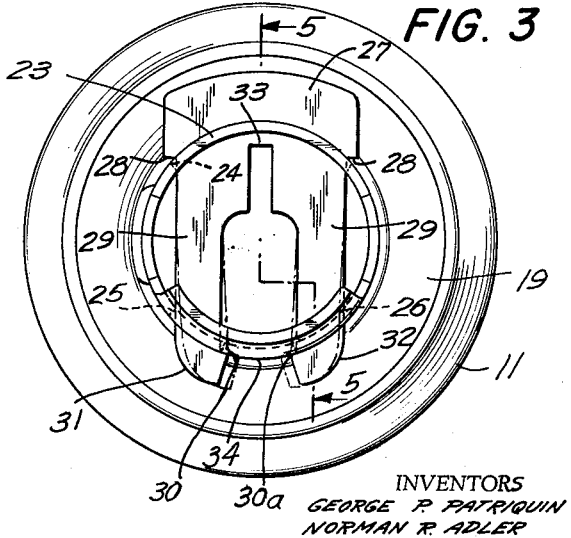
INVENTORS
GEORGE P. PATRIQUIN
NORMAN R. ADLER
BY
their ATTORNEYS April 7, 1964   G. P. PATRIQUIN ETAL   3,128,116
RETAINER MEANS FOR CYLINDRICAL LOCKS
Filed Nov. 15, 1961   2 Sheets-Sheet 2

INVENTORS
GEORGE P. PATRIQUIN
NORMAN R. ADLER
BY
JBBassecher
their ATTORNEYS 3,128,116
RETAINER MEANS FOR CYLINDRICAL LOCKS
George P. Patriquin, Gardner, and Norman R. Adler, Fitchburg, Mass., assignors to Independent Lock Company, Fitchburg, Mass., a corporation of Massachusetts
Filed Nov. 15, 1961, Ser. No. 152,482
1 Claim. (Cl. 292—358)

This invention relates to lock assemblies and more particularly to cylindrical lock assemblies.

In a companion application there is described a cylindrical lock construction having as features thereof the provision of spaced tubular knob spindles mounted between opposed rosettes or escutcheons to operate latch mechanism. In this assembly there are employed escutcheons to provide axial bearings and end thrust faces, rotatably to support the spaced tubular spindles by means of the end thrust locking assembly by transverse keeper plates. The keeper plates themselves are coupled, and maintained against displacement even though manually positioned by separately applied retainer springs which are specially shaped for ready assembly. Such assembly, in a closely confined space involves a tedious operation in the course of installation and requires great finger dexterity, resulting in a time consuming operation by highly skilled and expensive labor.

It is an object of this invention to economize on and facilitate the operation of assembly of so much of the cylindrical lock as involves coupling the spaced spindles in relation to the corresponding escutcheon for axial and endwise rotatable support, by the provision of novel retainer plates having integral locking means.

More particularly, it is an object of this invention to provide assembly means of those portions of a lock construction which entails coupling a spindle and rosettes or esutcheons and supplies an end thrust relationship between these components which is more efficient and facile to assemble, to effect novel and substantial economies in labor and materials.

To attain these objects and such further objects as may appear herein or be hereinafter pointed out, reference is made to the accompanying drawings, forming a part hereof, in which—

FIGURE 1 is a fragmentary sectional view of a cylindrical lock illustrating the coupled position of keeper plates in accordance with this invention;

FIGURE 2 is an exploded perspective view of essential parts thereof;

FIGURE 3 is an end elevation of an inside spindle and keeper plate in assembled position;

FIGURE 4 is an end elevation of an outside spindle and keeper plate in assembled position;

Figure 5:
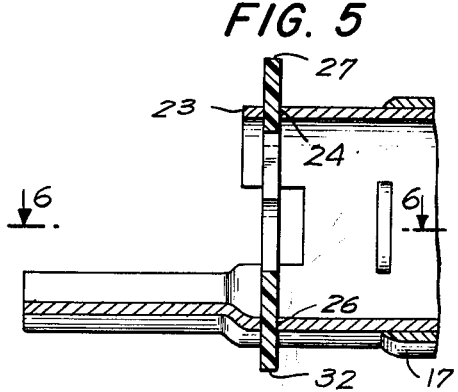
Figure 6:
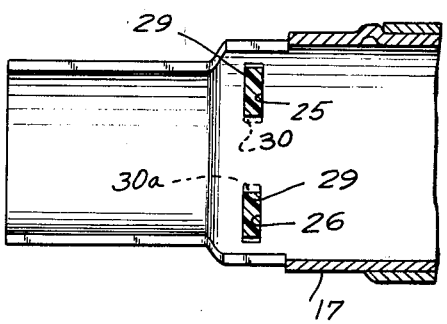
Figure 7:
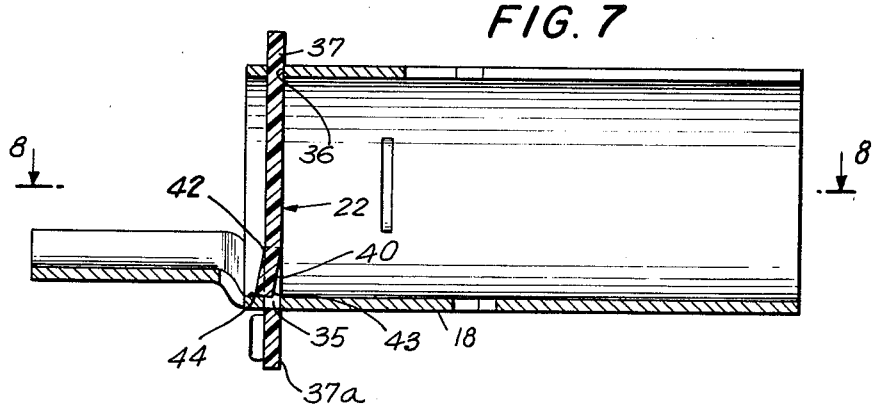
Figure 8:
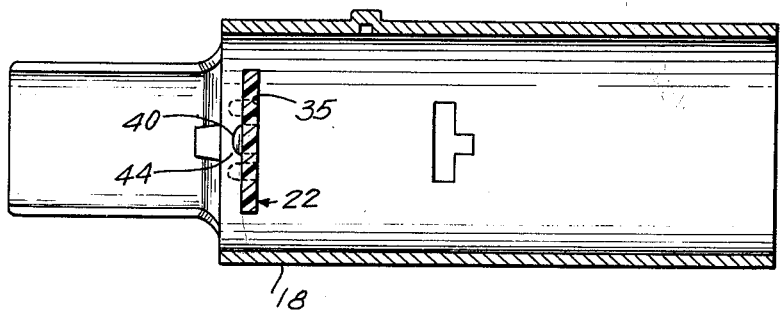

FIGURE 5 is a section on the line 5—5 of FIGURE 3;
FIGURE 6 is a section on the line 6—6 of FIGURE 5;
FIGURE 7 is a section on the line 7—7 of FIGURE 4;
FIGURE 8 is a section on the line 8—8 of FIGURE 7.

Reference will now be made to the drawing wherein the invention is directed to the provision of assembly means for coupling the knob operated spindle of a cylindrical lock with the corresponding escutcheon.

In the drawing, FIGURE 1, there is shown a fragmentary portion 10 of a cylindrical lock which is more specifically illustrated in a companion application Serial No. 828,530, filed July 21, 1959, of which this application is a continuation in part. In the present construction, as in the companion application, inside and outside escutcheons or rosette shells 11 and 12, respectively, are provided with rosette cores 13 and 14 of nylon type plastic. The cores 13 and 14 are provided with spindle sleeve bearings 15 and 16, through which is rotatably supported the inside spindle sleeve 17 and outside spindle sleeve 18. The inside and outside spindle and knob rosette cores are formed with end thrust bearing faces 19 and 20, respectively, which are coordinated in coupled relation by keeper plates 21 and 22, respectively.

The inside spindle sleeve 17 adjacent its inner end 23 is provided with substantially diametrically located keeper slot 24, in opposed position to twin slots 25, 26, all of which are aligned to one side of the bearing face 19 and through which the keeper plate 21 may be slidably projected.

The keeper plate 21 has a projecting portion 27 to one side of the spindle wall abutment shoulders to limit the sliding projection in one direction, and terminating in integrally formed, bifurcated branch portions 29, 29, each having a terminal stop hook portion 30, 30a, in opposed position along the length of each branch, to camming portions 31, 32. The connecting back 33 for the bifurcated branches is spaced for a length from the stop ends or camming ends 31, 32 and the nature of the stock of the keeper plate 21 is to furnish a resilience to deflection in the plane of the plate, as well as a self-lubricating function by the use of a nylon type plastic.

The du Pont de Nemours Delrin and Zytel nylon are preferred, especially where the rosette core is constituted of like material, to provide the end thrust bearing face 19.

With the components so provided, assembly of the inside knob spindle in relation to the inside rosette core and rosette is easily effected manually, by pressing the retainer plate 21, with its terminal stop means 31, first through the keeper slot 24 which is axially extended to receive the bifurcated branches, but acts as an abutment to the shoulders 28 to extend the end thrust projecting portion when the stop means 30 have entered the keeper slots 25, 26 to one side of the spindle.

This latter action is effected to bias the hooked portions in locked position with the keeper slots 25, 26 by reason of these slots being more widely spaced than the bifurcated branches in their normal, unbiased position, and when pressed to have the camming edges 31, 32 against the end walls of the keeper slots 25, 26, will first be spread apart and then snap into and under the outer wall surface 34 of the spindle 17 to lock the hook portions 30, 30a into opposed position against any tendency to displace the keeper plate 21.

All of these assembly operations may be performed without special jigs or tools, rigidly and quickly to couple the keeper plate and spindle into operating position and provide an efficient end thrust bearing connection for these relatively rotatable parts.

Similarly, within substantially the same concept, the outside knob spindle 18 and outside rosette 20 may be simply assembled with the keeper plate 22. The outside spindle 18 (see FIGS. 4, 7 and 8 specifically) is provided with diametrically positioned keeper slots 35, 36, aligned transversely to have the inner wall of the keeper slots substantially in close alignment with the inner end thrust bearing face 20 of the outside rosette core 14. The keeper plate 22 to be used with the outside assembly has a projecting portion 37 medially, to each side of which the body is widened to provide shoulder abutments 38, 39. In opposed relation to the shoulder abutments, the trailing end of the keeper plate 22 is provided with a tongue which is pressed or deflected resiliently from the main body of the retainer plate by the outlining, generally U-shaped slot 41, to leave a leading cam surface 42 and a trailing terminal stop edge 43 positioned diametrically opposed to the shoulders 38, 39, to correspond to the internal diameter of the knob spindle in the transverse plane of slots 35, 36.

As in the case of the inside knob keeper plate, the outside keeper plate 22 is preferably made of resilient stock of the nylon type plastics Delrin and Zytel for their rigidity, elasticity, as well as their bearing value against the surface of the end thrust bearing surface of the rosette core, with assurance for itself as well as in the case of the inside assembly, to provide close and constant clearance within wide ranges of thermal humidity variants.

When ready for assembly of the outside knob spindle and rosette assembly by sleeving the knob spindle 18 and rosette 14 to align the face bearing 20 with the keeper slots 35, 36, the keeper plate 22 is thrust into position. The projecting end 37 is first pressed to enter through the keeper slot 35 and then into the keeper 36 until the shoulder abutments 38, 39 engage the inner surface of the spindle 18. As this latter sliding movement occurs, the tongue 40 is cammed into the plane of the keeper plate by the side walls of the keeper slot 35, first to depress the tongue and then to release it or to snap resiliently when the terminal stop edge 43 may clear the inner wall surface 44 of the spindle, thus locking the keeper plate against further slidable displacement. The latter assembly thus provides end thrust projections 37 and 37a to each side of the tubular knob spindle in relation to the corresponding rosette core bearing surface, as in the first embodiment described.

By the construction described, an end thrust bearing assembly has been effectively provided which requires no special jigs or manual dexterity of inordinate skill, and with economy in labor and materials, while adding long life for the intercoupled components.

Having thus described the invention and illustrated its use, what is claimed as new and desired to be secured by Letters Patent is:

In a cylindrical lock assembly, a spindle having diametrically opposed slots disposed in a plane normal to the axis of said spindle, an escutcheon having an axial bearing in which said spindle is rotatably mounted, thrust bearing means on said spindle limiting axial movement of said spindle and said escutcheon in a first direction, and a retainer plate endwisely insertable into locking engagement into said slots of said spindle forming thrust bearing means limiting axial movement of said spindle in a direction opposite said first direction, said retainer plate including a resiliently deflectable retainer shoulder portion normally offset from the plane of said plate and a cam surface adjacent said retainer shoulder portion, said cam surface, upon endwise insertion of said plate into a slot, being positioned to coact with portions of said spindle adjacent said slot to deflect said shoulder portion toward the plane of said plate and into registry with said slot, said shoulder portion being resiliently urged out of registry with said slot upon passing through said spindle, said plate including a spindle wall abutment shoulder positioned to limit transverse movement of said plate with respect to said spindle.

References Cited in the file of this patent

UNITED STATES PATENTS

| | | |
|---|---|---|
| 2,660,466 | Cerf | Nov. 24, 1953 |
| 2,847,240 | Stone et al. | Aug. 12, 1958 |
| 2,850,313 | Check et al. | Sept. 2, 1958 |